United States Patent [19]

Ulbers

[11] Patent Number: 5,126,879
[45] Date of Patent: Jun. 30, 1992

[54] OPTICAL RETRO-REFLECTOR

[75] Inventor: Gerd Ulbers, Weilersbach, Fed. Rep. of Germany

[73] Assignee: Hommelwerke GmbH, Baden-Wurttemberg, Fed. Rep. of Germany

[21] Appl. No.: 582,766

[22] Filed: Sep. 14, 1990

[30] Foreign Application Priority Data

Sep. 16, 1989 [DE] Fed. Rep. of Germany ....... 3931022

[51] Int. Cl.⁵ .............................................. G02B 5/126
[52] U.S. Cl. .................................................. 359/534
[58] Field of Search ............... 350/104, 109, 416, 445, 350/446

[56] References Cited

U.S. PATENT DOCUMENTS 1,934,492 11/1933 Garbarini .............................. 350/104
4,889,409 12/1989 Atcheson .............................. 350/104

Primary Examiner—Rodney B. Bovernick
Assistant Examiner—James Phan
Attorney, Agent, or Firm—Allegretti & Witcoff, Ltd.

[57] ABSTRACT

Optical retro-reflector in particular for purposes of interferometry. It has the form of a sphere and is fashioned from an optically refractive material, the index of refraction of which is at least approximately 2, but by preference precisely 2. The reflecting surface of the sphere is coated with a film of reflecting material, preferably vapor-deposited metal. The retro-reflector can be manufactured cheaply and with a high level of surface quality. It has a high degree of reflecting power.

2 Claims, 1 Drawing Sheet

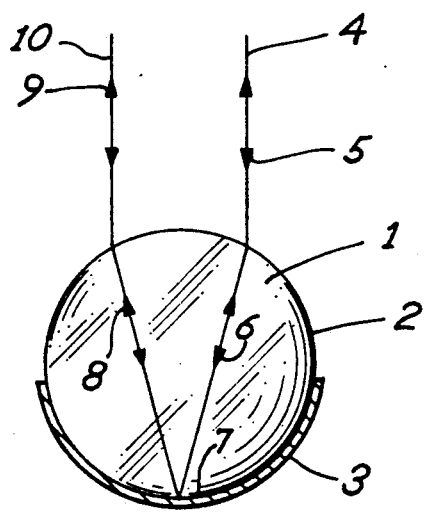

OPTICAL RETRO-REFLECTOR

BACKGROUND OF THE INVENTION

The invention relates to an optical retro-reflector of the type used in interferometry.

PRIOR ART

An optical retro-reflector of this type is disclosed in German Patent DE-PS 36 30 887. It has the form of a sphere and it is mounted on a part, the movement or distance of which in relation to an optical interferometer is to be measured. The function of the retro-reflector is to reflect back to the interferometer itself the light that is coming from the interferometer. The light is focused onto the reverse side of the sphere and is reflected from there. However, the degree of reflecting power is limited.

SUMMARY OF THE INVENTION

The object of the invention is to provide a retro-reflector of this type and to improve its reflecting capability, in order to permit incoming light to be reflected back into itself.

This object is accomplished by means of a retro-reflector made from a material having an index of refraction of approximately 2, but by reference precisely 2. With such an index of refraction, the intensity of the reflection reversing back into itself is improved to an appreciable extent.

Preferably, the reflecting surface of the sphere is vapor-coated with a reflecting material. In this way, the reflecting capability can be increased by approximately one hundred percent. In this connection, it is appropriate to select the reflecting material as a function of the wavelength of the light to be reflected. When the wavelength of the light to be reflected is 800 nanometers or greater, gold is especially appropriate as the material of choice.

BRIEF DESCRIPTION OF THE DRAWING

With reference to the drawing, the invention will be elucidated in greater detail by means of an exemplified embodiment. The single view shows a cross section through the sphere and the path of the light waves.

DETAILED DESCRIPTION OF THE PRESENT INVENTION

The drawing shows a sphere 1 of an optically refractive material. Its reflecting surface 2 is externally coated to the extent of approximately one-half of the spherical surface with a film 3 of a highly reflective material, preferably metal. When the wavelength of the light to be reflected is $\lambda = 800$ nm, this material is gold.

A sphere of this type can be manufactured in a simple manner with high quality of surface, and it is appreciably less expensive to manufacture than are those triple prisms of the prior at which demand complicated processing. The application of the film 3 is effected in a simple manner by vapor-deposition.

The mode of action of the sphere is made clear by a schematically depicted path of rays. A ray light 4 strikes in the direction of arrow 5 against the surface 2 of the sphere 1 and is refracted there. It is cast in the direction of arrow 6 against an interior portion 7 of said surface 2 of the sphere 1 and/or against the film 3. There it is reflected back int the direction of arrow 8, until it (i.e., the ray of light) is refracted again at the surface 2 and is reflected back in the direction of arrow 9 as a ray of light 10 which runs parallel to the original ray of light 4.

When the light is traveling in the inverse direction, the same relationships are applicable. They are indicated by arrows that are drawn at no greater intervals. For rays of light that are parallel to the indicated rays 4 and 10, and which strike against other sites on the surface 2, the same optical ratios apply, with the result that essentially all of the light striking against the sphere 1 is reflected back into itself.

If the sphere 1 is mounted in a manner not shown in the area of the film 3 onto the surface of a moving body, e.g., a measuring tappet of a longitudinal gauging probe, and if the sphere 1 is radiated with light from an optical interferometer, then said sphere 1 will reflect the light back into this optical interferometer, where upon, in a well-known manner by means of interference measurement, the movement of the sphere and also that of the surface, on which latter the sphere is mounted, can be determined.

What is claimed is:

1. An optical retro-reflector for use in combination with an interferometer comprising
   a sphere fashioned from an optically refractive material having an index of refraction equal to 2;
   said sphere having an incident area and a reflective area which are accurately shaped, said reflective area being coated externally with a film of vapor-deposited metal reflecting material, the incident area being uncoated;
   whereby a light beam incident on any portion of the uncoated area of said sphere is focused on said reflecting surface which reflects back essentially all of the incident light.

2. The optical retro-reflector, according to claim 1, in which, when a wavelength of the light to be reflected is approximately 800 nanometers or greater, said reflecting material is gold.

* * * * *